United States Patent

[11] 3,615,721

| [72] | Inventor | Henri C. Silberman |
| | | Richmond, Va. |
| [21] | Appl. No. | 693,180 |
| [22] | Filed | Dec. 26, 1967 |
| [45] | Patented | Oct. 26, 1971 |
| [73] | Assignee | Philip Morris Incorporated |
| | | New York, N.Y. |

[54] METHOD FOR THE MANUFACTURE OF FOOD FROM PLANT MATERIAL
1 Claim, No Drawings

[52] U.S. Cl. ........................................... 99/199,
99/204, 99/106, 99/2 R, 71/23
[51] Int. Cl. ........................................... A23b 7/00,
A23k 1/14
[50] Field of Search ............................................ 195/8;
260/209.5; 99/133, 100, 103, 199, 204, 106

[56] References Cited
UNITED STATES PATENTS

| 3,009,815 | 11/1961 | Lorant ........................... | 99/204 |
| 3,031,307 | 4/1962 | Blakemore .................... | 99/103 |
| 3,117,878 | 1/1964 | Anderson ....................... | 99/106 |
| 3,259,504 | 7/1966 | Noznick ......................... | 99/106 |

OTHER REFERENCES

Pectinol Products May 1964 Rohm & Haas pg. 1
Encyclopedia of Chemical Technology Vol. 8 Executive Editor: Anthony Standen Interscience Publishers, N.Y., London pp. 182– 188

*Primary Examiner*—Norman Yudkoff
*Assistant Examiner*—Martin G. Mullen
*Attorney*—Watson, Leavenworth and Kelton

ABSTRACT: The present invention refers to an edible product and a process for making same from food materials and food by-products by treating the same with a mixture of enzymes (i.e. an enzyme mixture which exhibits catalytic cellulase, hemicellulase and pectinase activity), mechanically treating the food material to convert it to a slurry or a paste and thereafter forming said food material by casting, spraying, extruding or the like into a mechanically strong, flexible, cohesive food product in the form of a sheet, ribbon, strand, band or the like suitable for storage and drying the same.

METHOD FOR THE MANUFACTURE OF FOOD FROM PLANT MATERIAL

BACKGROUND OF THE INVENTION

This invention refers to a food product and the process for making it which involves the treatment by enzyme preparations of plant, vegetable and fruit materials and of food byproducts and their conversion to an edible and storable form of high solids contents.

Many methods for the dehydration of food materials are known. Common to all successful dehydration methods are the requirements of favorable product quality at an acceptable drying cost. Methods for preparing substitute foods and beverages of high nutritional value from low-cost raw materials are known. Methods for the treatment of plant material with enzymes are also known. These enzymes are generally employed to clarify fruit juices, to reduce the viscosity of slurries or purees, to liquify certain cell wall solids and to modify taste drastically.

Preparations of such food products when applied to a moving belt for drying usually would result not in a continuous sheet but in the form of a dust or flake without any adhesion between the particles. A considerable amount of mechanical mixing is required to obtain a mush, slurry or paste of suitable viscosity for either casting, extruding or spraying. It probably would be possible to obtain some sort of a slurry by employing extensive, special mechanical treatment through the use of refiners, homogenizers, Valley beaters, defibrators, macerators, mills, crushers or similar machines. However, such machines and the treatment in these machines would be prohibitively costly in most cases.

In addition, in order to obtain a cohesive cast, sprayed or extruded vegetable or fruit material, it would be necessary to apply either the aforementioned extensive mechanical treatment or to add to the material a natural or synthetic film-forming gum. This procedure may make the product prohibitively costly, would not add appreciably to its nutritive value and would introduce considerable amounts of foreign matter.

SUMMARY OF THE INVENTION

This invention relates to a novel food product which is in a form permitting extended storage of the same without special care and permitting the use of the same, under a variety of circumstances, to provide a uniform source of nutriment and to a process for making said food product. More particularly, the present invention relates to a food product and a method or process for the rapid and economical manufacture of food of high solids content in a relatively continuous cohesive form such as sheets, filaments, strands, rods, and the like which can be cut into desired size for storage or use, and which contain the food in a very uniform composition, the uniformity of which is readily maintained.

The product of the present invention is novel and unique in the food field and can be utilized in many ways. For example, it can be utilized as such or mixed, upgraded, mechanically treated, heated or dissolved in various different ways before consumption by humans or animals takes place.

The present invention also makes possible the production of dry reconstituted cellulose, hemicellulose and pectin-containing harvest or factory byproducts for fertilizers and the production of cohesive reconstituted food products for human and animal consumption out of whole vegetables and fruits or of parts therefrom, such as cannery or sugar mill byproducts. It provides a simple continuous process of converting factory byproducts or wastes which may cause water pollution or spread disease and of converting other plant material susceptible to spoilage into a concentrated form of low moisture content suitable for human or animal consumption as a food or drink and which is stabilized against rancidity or other deterioration at a considerable savings in time and cost. This is accomplished by modifying high carbohydrate, low protein food products by the addition of proteins from plant, animal or micro-organism sources resulting in a uniform cohesive product of balanced nutritional value.

Improvement in taste is also realized from the present invention as in the conversion of bitter tasting flavonoid glycosides into bland hydrolysis products and in the treatment of carrots that develop an apricotlike taste. During the conversion of such vegetable and fruit material essentially the same chemical composition is maintained by adding nothing besides catalytically small amounts of enzymes and by taking away nothing while improving digestibility.

The products of this invention have the advantage of making waste products usable, of having an extended storage life, of taking up less space in storage on a weight basis, of providing more food value on a weight basis, of being more digestible and of either having the original flavor preserved or changed favorably.

By using the enzyme system of this invention to treat the vegetable, fruit, plant or forage material, the flurry or paste obtained by the small amount of mechanical mixing called for will possess the suitable rheological properties for casting, spraying or extruding. Thus, extensive mechanical treatment is made unnecessary by the use of suitable enzyme preparations. No costly additives have to be employed to produce the cohesive structure and no mechanical or thermal pretreatment of the vegetable or fruit is necessary.

Vegetables and fruits which were processed successfully according to the present invention include lettuce, cabbage, alfalfa, carrots, celery, oranges, raisins, apples, grapefruits, lemons, cantaloupes, squash, cucumber, tomatoes, mushrooms and peppers. These food products have been used in soft drinks, dried soups, cakes, cookies, candy, confectionery products and in other food.

DESCRIPTION OF THE PREFERRED EMBODIMENTS

In accordance with the present invention, cohesive food sheets of excellent quality are obtained by mixing ground food parts with water and a catalytic amount of a specific enzyme system and treatment of the same by the mechanical means to be described in more detail later in this specification.

The process of the present invention includes the steps of treating a food (i.e. an edible material such as a vegetable or fruit), animal feed (e.g. grass, etc.), plant material (e.g. leaves, roots, stems, seeds), or a mixture of the same, which material to be treated (i.e. mixture or single food) contains no more than 50 times the content of film forming carbohydrates by weight of starch, no more than 50 times the content of film forming carbohydrates by weight of protein material, no more than 10 times the content of film forming carbohydrates by weight or oily material and no more than 5–20 times the dry solids content by weight of water, with from 0.01 to 20% by weight of an enzyme mixture which exhibits cellulose activity, hemicellulase activity and pectinase activity, mechanically treating the food material to convert it to a slurry or a paste and thereafter forming said food material into a sheet, ribbon, rod, strand, band or the like and drying the resulting product to a moisture content of from 3 to 20 percent by weight.

A requirement for the vegetable or fruit to be processed according to this invention is the presence in them of hemicelluloses and pectin. Cellulose may be but need not be present. The enzyme systems should be such that they partially degrade the cellulose, the hemicelluloses and the pectin. Thus suitable enzyme systems must exhibit hemicellulase activity and pectinase activity, i.e., they must include a hemicellulase and a pectinase.

As an illustration of this basic requirement in the present invention, the following example is set forth.

EXAMPLE 1

In order for the enzyme preparation to have some activity on the plant material, the plant material must contain pectin and/or such hemicelluloses which can be degraded into intermediate weight oligosaccharides. Not all the polysaccharides, not all the hemicelluloses and not all the the plant gums were being degraded in a similar manner by the enzyme preparations which were found suitable. This was found by the following experiment in which suitable enzyme preparations were exposed to pectin, xylan, guar gum, locust beam gum, algin, gum acacia and gum tragacanth. Five grams of these polysaccharides were separately admixed with 500 ml. portions of an acetic acid-acetate buffer solution having a pH of 4.5 and a molarity of 0.04. Then one portion of 0.05 gram of the enzyme system was added to each mixture, the mixture being maintained at 45° C. for a period of 24 hours. The resulting mixtures were then each placed in 1000 ml. of acetone, whereby precipitates formed which comprised undegraded or little degraded polysaccharides. These precipitates were separately filtered, and dried in a forced air circulation oven at 45° C. to constant weight. Controls were also run for each of the materials, under identical conditions, except that no enzyme was present.

| | Percent degradation due to enzyme | | | | | |
|---|---|---|---|---|---|---|
| | Rohm and cellulase 35 | Wallerstein cellase 1000 | Miles cellulase 4000 | Nutr. Biochem. Pectinase | Rohm and Haas pectinol R 10 | Rohm and Haas lipase B concentrate |
| Pectin | 90.0 | 87.3 | 22.6 | 85.5 | 89.9 | 89.0 |
| Xylan | 41.8 | 58.0 | 44.7 | 23.3 | 45.0 | 83.4 |
| Guar gum | 49.3 | 34.4 | 65.0 | 11.1 | 44.6 | 40.4 |
| Locust bean gum | 88.5 | (¹) | 66.5 | 4.5 | 47.0 | 6.20 |
| Algin | 0.0 | (¹) | 0.0 | (¹) | 0.0 | 0.0 |
| Gum acacia | 1.1 | 8.7 | 8.7 | (¹) | 11.1 | 5.4 |
| Gum tragacanth | 0.0 | (¹) | 0.0 | (¹) | 0.0 | 0.0 |
| Cellulose | 10.5 | 11.6 | 5.7 | 1.6 | 18.0 | 5.6 |

¹ Not determined.

All these enzyme preparations, Cellulase 35 (a mixture of polysaccharases including cellulase, pectinase and hemicellulase), Pectinol R 10 (Pectinol is a mixture of pectic enzymes and includes other enzymes such as cellulase; R 10 includes a diatomaceous earth filler), Lipase B (an enzyme preparation standardized with salt exhibiting protease activity at pH 5 and hydrolysis of fats and fatty acid esters), all from Rohm and Haas Co., Philadelphia, Pa., Pectinase (Nutritional Biochemical Corp., Cleveland, Ohio), Cellase 1000 (a fungal cellulase preparation derived from a selected strain of Aspergillus niger, and which contains trace amounts of protease, amylase, pectinase, beta galactosidase and cellobiase, from Wallerstein Co., Staten Island, N.Y.,) and Cellulase 4000 (Miles Laboratories, Elkhart, Inc.), are capable of producing good cohesive sheets, filaments, strands or bands in accordance with the present invention. All the enzyme preparations contain enzymes which degrade pectin, hemicelluloses, cellulose and plant gums.

The results of this example expressed in the table indicate that the various enzyme preparations which were found to produce sheets, filaments, strands or bands do not exhibit the same activity towards the same substances and do not degrade certain polysaccharides at all (i.e., gum tragacanth, algin).

Example 1 demonstrates that cellulase may be present but need not be present whereas pectinase and/or hemicellulase should be present. The results expressed in the table in Example 1 show that not all the polysaccharides are converted by the industrial enzyme preparations which were available. Of all the enzyme preparations which have been screened, only Nutr. Biochem. Pectinase proved to be a sheet-forming enzyme preparation of very low cellulase activity. All the other preparations showed cellulase activity although it is believed that cellulase activity is of minor importance in the context of the invention. The enzyme preparations according to the invention, when tested as in example 1, should degrade more than 20 percent pectin, and more than 20 percent xylan.

One method which can be employed to determine whether or not an enzyme system exhibits cellulase activity is to place 10 grams of cellophane in a solution containing one gram of the enzyme system and maintained at a pH of 4.5 and a temperature of 45° C. for a period of 24 hours. After 24 hours, the remaining cellophane is removed from the solution by filtration, is washed with water and dried in a forced air circulation oven at a temperature of 45° C. until constant weight is attained. A control is run, using cellophane treated under exactly the same condition, but in the absence of any enzyme. Cellulase activity, as it is used in this application, is exhibited when the cellophane shows a weight decrease after the treatment these 0.5 percent or more, as compared with the control which contained no added enzymes.

Obviously, other assay methods which will determine the existence of the three enzymes may also be employed.

Certain fruits and vegetables give poor results because a viscous slurry and cohesive sheet are difficult to obtain. These unsuitable fruits or vegetables are those high in starch and to some extent those high in fatty oil and proteins or high in water content. In these instances, the end product, after drying, may be a powder or flake of mainly starch or syrup. Fruits like strawberries, seeds like nuts and vegetables like potatoes will probably be unsuitable for treatment with the enzyme systems according to the present invention. However, so long as there are enough pectins and hemicelluloses present to be acted upon by the enzymes, the presence of starches, proteins and lipids does not interfere with the action of the sheet-forming enzymes. The starches, the proteins and the lipids can be considered as being more or less inert filling materials as far as sheet formation is concerned. One has, therefore, to concentrate on the presence of enough convertible pectic and hemicelluloses, rather than putting too much emphasis on the presence of starches, proteins and lipids. Therefore, it does not seem necessary to provide any elaborate tests for the determination of these noncellulosic, nonhemicellulosic and nonpectic constituents of plant materials.

Sheet formation can always be achieved by the presence of convertible pectin and hemicelluloses already in the plant material, or by the addition of such convertible materials in the form of pure compounds (i.e., pectin), or by the addition of plant materials rich in these compounds (i.e. carrots). Certain plant materials high in fats and proteins thus can be converted into sheets. The addition of fats and proteins to other plant materials changes the physical properties of the sheets but does not impede sheet formation. For example, high-protein plant products such as mushrooms form good plastic and strong sheets and the addition of high amounts of proteins in the form of, for instance, yeast hydrolyzate does not hinder sheet formation. Starches do not contribute to sheet formation and no satisfactory sheets are obtained from high-starch plants such as potatoes and sweet potatoes. Various amounts of native starch, isolated starch or processed starch may, however, be present in formulations which yield good, tough sheets.

EXAMPLE 2

All sheets were prepared with 0.2 g. Rohm and Haas Cellulase 35 according to the method described in example 1. All weights were dry weights based on water-free materials.

| Experiment | Starting Material | Evaluation of Cast Sheets |
|---|---|---|
| I | 18 g. carrots | very good, plastic sheet. |
| II | 18 g. carrots, 16 g. olive oil | good, plastic sheet; when sheet is squeezed oil oozes out |
| III | 38 g. soybeans | very weak, cracked, brittle sheet. |
| IV | 9 g. carrots, 28 g. soybeans | weak, brittle sheet. |
| V | 18 g. carrots, 28 g. soybeans | good, tough sheet |

The soybeans, which contain 9 percent moisture, 40 percent proteins, 18 percent fats, 4.6 ash and 17 percent carbohydrates (mainly sucrose, raffinose, stachyose and pentosans) cannot be made into a good sheet by the use of enzymes alone. However, through the admixture of some carrots (containing about 7 percent pectin on a dry substance basis) good sheets are obtained.

EXAMPLE 3

All sheets were prepared with 0.2 g. Rohm and Haas Cellulase 35 according to the method described in example 1. All weights were on a dry substance basis.

| Experiment | Starting Material | Evaluation of Cast Sheet |
| --- | --- | --- |
| I | 28 g. mushrooms | very good sheet |
| II | 18 g. carrots, 30 g. yeast hydrolyzate | sticky, tough sheet |
| III | 18 g. carrots, 60 g. yeast hydrolyzate | sticky, tough sheet |

The mushrooms had a protein content of 18 percent; the yeast hydrolyzate had a protein content of 70 percent. In III, the total protein content of the carrot-yeast hydrolyzate mix was 54 percent and it was still possible to obtain a tough sheet.

The protein content should not be higher than 50 times the content of film forming carbohydrates in a particular material or combination of materials. The test employed can be based on sheet formation (example 3) or on viscosity measurements (example 5).

EXAMPLE 4

All sheets were prepared with 0.2 g. Rohm and Haas Cellulase 35 according to the method described in example 1. All weights are given on a dry substance basis.

| Experiment | Starting Material | Evaluation of Cast Sheets |
| --- | --- | --- |
| I | 56 g. yams (sweet potatoes | sheet rather weak, brittle sheet. |
| II | 29 g. potatoes | no sheet formation |
| III | 14 g. potatoes, 9 g. carrots | very weak, brittle sheet. |
| IV | 30 g. rice starch, 9 g. carrots | very weak, brittle sheet. |
| V | 30 g. pregelatinized starch | weak, brittle sheet. |
| VI | 30 g. pregelatinized starch, 18 g. carrots | good strong, brittle sheet. |

This indicates that the amount of starch should not exceed by more than about 50 times the amount of sheet forming carbohydrates (such as carrot pectin) when there is also no excessive other filling material present which does not contribute either to sheet formation. The test employed can be based on sheet formation (example 4) or on viscosity measurements (example 5).

The oil content should not be higher than 10 times the content of film forming carbohydrates in a particular material or combination of materials. The test employed can be based on sheet formation (example 2) or on viscosity measurements (example 5).

The content of all the inert ingredients combined, e.g. non-convertible carbohydrates (starch included), oils, fats, lipids, proteins, lignin, mineral substances, should not exceed more than 100 times the amount of convertible carbohydrates.

The water content which is permissible in the food materials to be processed is from about 5 to about 20 times the dry solids content. In other words, the solids content of the slurry before casting, extruding or spraying, should be between 5 and 20 percent. The water content would thus be between 80 and 95%.

By defining the viscosity range of the product of any plant material after mechanical treatment in a Waring Blendor, Cowles Dissolver or disc refiner (Sprout-Waldron refiner), one may determine whether the formation of a good sheet is possible and whether the enzyme preparation is suitable. There is a considerable increase in the viscosity of a slurry containing the active enzyme as compared to the viscosity in the control experiment when the enzyme 50 absent.

EXAMPLE 5

The following materials and equipments are required for a sheet-formation test based upon viscosity measurements: –50 mesh ground bright dry plant material; water; the enzyme; a Brookfield viscometer RVT; a Waring Blendor; a stop watch. Add to a 1000 ml. Waring Blendor jar 600 ml. distilled water, 0.1. g. of the enzyme and 40 g. of –50 mesh plant material. Mix very briefly and let the mixture stand overnight at room temperature. Stir the mixture at top speed for exactly 3 minutes and put the slurry into a 500 ml. beaker. Determine the viscosity with spindle No. 4 0.5 and 100 r.p.m.

The following table shows the influence on the viscosity of an amount of a good sheet-forming enzyme expressed in percent based on dry plant material:

| Amount of enzyme, % | 0.0 | 0.025 | 0.1 | 0.25 | 1.0 |
| --- | --- | --- | --- | --- | --- |
| Viscosity, c.p.s. at 0.5 r.p.m. | 92,000 | 104,000 | 120,000 | 148,000 | 152,000 |
| Viscosity c.p.s., at 100 r.p.m. | 700 | 1,200 | 1,300 | 1,400 | 1,440 |

It can be seen that for good sheet formation the viscosity has to increase. Viscosities of 120,000 to 150,000 c.p.s. at 0.5 r.p.m. (or 1,300 to 1,600 c.p.s. at 100 r.p.m.) are good viscosities for casting.

Of the four Rohm and Haas Co. enzymes tested at 1.0 percent based on dry plant material, only Pectinol 41 P conc. demonstrated good sheet-forming characteristics.

| Enzyme preparation | No enzyme | Pectinol 41P conc. lot 42, f=14.2 | Cellulase 38 conc. mix 3, f=0.97 | Rhozyme 41 conc., f=3.06 | Rhozyme P-11 lot 8, f=6.21 |
| --- | --- | --- | --- | --- | --- |
| Viscosity, cps. at 0.5 r.p.m | 72,000 | 148,000 | 84,000 | 88,000 | 80,000 |
| Viscosity, cps. at 100 r.p.m | 620 | 1,600 | 64 | 800 | 640 |

The above results, obtained on a small scale in Waring Blendor jars, were confirmed by large pilot plant experiments in which Cowles Dissolvers and Sprout Waldron refiners provided the required mechanical treatment.

While we do not wish to be bound by any particular theory, we believe that the outstanding results, such as cohesion, obtained in accordance with this invention are due to the fact that the present enzyme systems split certain plant cell wall components, such as the high molecular weight, water-insoluble pectic, cellulolytic and hemicellulolytic components of the food being treated into either lower or intermediate molecular weight, water-soluble materials, or slightly higher molecular weight substances which swell in water. The resulting materials are the adhesive which cause the vegetable or fruit material to adhere together to result in the superior reconstituted food sheets of the present invention.

It was found, however, that not all the commercially available cellulase, hemicellulase and pectinase preparations are suitable. Unsuitable are those preparations which degrade cellulase, hemicellulases and pectin exclusively or to a very large extent directly into mono-, di-, or tri-saccharides and do not produce the degradation products of intermediate molecular weight which possesses the properties of an adhesive or a glue. Some of these degradation products of lower molecular weight than the original cellulose, hemicelluloses and pectin have also the properties of a humectant. These degradation products modify the original vegetable or fruit into a novel product.

The enzyme preparations necessary for the production of cohesive sheets according to the present invention are readily available on the commercial market in the form, for example, of an enzyme system including cellulase, hemicellulases and pectinase. Such enzyme materials are usually prepared from the growth of mold fungi on nutrient usually Suitable organisms include Aspergillus niger, Aspergillus oryzae, Penicillium chrysogenum notatum and the like. All three enzymes may be present in a single preparation or it may be necessary to combine more than one such preparation to provide the desired combination of the three enzymes. The mixing of several enzyme preparations has resulted in a better product.

Specific commercial enzyme preparations which have been found to include cellulase, hemicellulases and pectinase and which are suitable for sheet formation are Cellulase 35, Pectinol 59-L, (liquid preparation), Pectinol 41 P conc., Pectinol R10, Lipase B, all of Rohm and Haas Co., Cellulase (Astra Pharmaceutical Products, Inc.), Pectinase $P_1P_2$ (Nopco Co.,), Cellase 1000 (Wallerstein Co.), Cellulase 4000 (Miles Laboratories) and Pectinase Nutritional Biochemical Corp. These preparations contain varying amounts of other enzymes such as protease, amylase, lipase and catalase. These additional enzymes are not necessary for the purpose of the present invention but it has been found that they have no undesirable effects on the products of the present invention.

Because of the very specific action of the enzyme system on cellulose, hemicelluloses and pectin and because of the small amount of conversion, there is little chemical difference between the original and the reconstituted product. Flavor is generally not affected since neither the original cellulose, hemicelluloses and pectin nor the degradation products have any flavor. It is, however, possible to improve or change the flavor or the nutritious value of the product by the addition of other enzymes, by the addition of other food products or by the addition of chocolate, nuts, minerals, gums, flavorants, spices, color, antioxidants or vitamins. Still other compounds may be added to create special effects in a subsequent application of the product. One can prepare mixed sheets which are laminated into several flavor layers. Several layers of reactant materials may be laminated for subsequent activation of water or other solvents or both.

The nutritive value for humans and animals may be improved by the action of the enzyme systems. The value of in vitro cellulose and hemicellulose digestion as a prediction of nutritive value has been demonstrated.

The material to be processed may be employed in different sizes, varying from particles which will pass through a 10 mesh screen to particles which will pass through a 400 mesh screen.

The size of the material to be processed is not critical as long as good penetration of the enzyme into all parts of the mass is assured.

It is necessary during the treatment of the material with the enzyme system that water be present in amounts corresponding to about 8 to 15 parts by weight per part of dry material. This water will have to be added in the form of pure water or material juice. In the case of fresh plant material its natural water content usually suffices.

Enzyme concentrations which may be employed should be in the range of 0.01 to 20 percent based on the dry weight of the vegetable, plant, fruit or other material, but preferably in the range of 0.03 to 10 percent. The lower range is preferred in the case of a very active or potent enzyme preparation or if a mechanically weak sheet of low humectant content is desired. The upper range is preferred in the cases of diluted enzyme preparations or if a very plastic or sticky material is desired or if the material is to be mixed with high protein or other additives prior to casting, spraying or extruding.

The treatment time is dependent upon the species of vegetable or fruit, the size of the plant material, the enzyme concentration, the degree of agitation, the temperature and the pH of the slurry. Generally the treatment time will vary between 15 minutes and 48 hours, but is preferably between about 2 and 12 hours. Under certain circumstances the addition of a preservative to prevent spoilage may be desired. Such preservatives should not interfere with the hydrolytic action of the enzyme preparation.

The pH during enzyme action may be from about 3.5 to about 6.0 but is preferably between about 4.0 and 5.0. This pH is very often the natural pH of the plant material. Acid may have to be added if the plant material exhibits a pH of more than about 5.5. The treatment temperature can be between about 20° and about 80° C. with the preferred temperature being between 25° and 60° C.

Before casting, spraying or extruding, the plant-enzyme system must be agitated. This may be accomplished by continuous stirring or the like or by periodic agitation. Stirring may be difficult and unnecessary at the beginning of the treatment when the plant material is of large size and relatively hard. Agitation will be easy and is necessary at the end of the enzyme action when the plant material has become mushy and forms a uniform slurry suitable for casting, spraying or extruding.

The uniform slurry can preferably be applied on a moving endless belt. A dry sheet is thereby formed which can be collected in big rolls, cut into large pieces, shredded or ground to a powder. The slurry can also be extruded into filaments, strands or bands. Drying of the sprayed, cast or extruded slurry can occur either at room or preferably at elevated temperature in an air stream for rapid moisture removal. The drying cycle may last for not longer than 0.1 to 10 minutes at ambient temperatures of 80 to 200° C. In certain instances high temperatures may be desired to obtain a "cooked" product. The drying can occur in air or in a more inert atmosphere such as nitrogen.

The invention may be further illustrated by the following examples:

EXAMPLE 6

Forty grams of dry alfalfa silage was added to a Waring Blendor jar together with 500 ml. water, Rohm and Haas Cellulase 35 and acetic acid. Cellulase 35 is a mixture of polysaccharases including cellulase, pectinase and hemicellulases. The natural pH of the alfalfa suspension being 5.3, acetic acid was added to bring the pH down to 4.5 for maximum enzyme activity.

The suspension was kept at room temperature for 17 hours, then stirred vigorously for about one minute and then cast with a casting knife on glass plates covered with a trace of silicon grease to facilitate removal of the dry sheets.

The dry sheets were analyzed by a sequential extraction procedure and the results compared with the untreated alfalfa hay as control. In the table below, A is the untreated alfalfa and B is the sheet prepared with 2.5 percent Rohm and Haas Cellulase 35 (based on the weight of the solubilized at pH 4.4.

All the results are expressed as percent on dry weight basis. A comparison is easy to make since there is no loss of product in the process. As can be seen from the figures, the hemicelluloses (12 percent KOH solubles), the lignin (sodium chlorite solubles) and the pectin (ammonium oxalate solubles) are partly solublized through the action of the enzyme.

|  | A | B |
| --- | --- | --- |
| Benzene—ethanol solubles | 21.6 | 34.2 |
| Hot water solubles | 15.0 | 11.9 |
| Ammonium oxalate solubles | 5.3 | 2.6 |
| Sodium chlorite solubles | 9.9 | 7.0 |
| 12% KOH solubles | 28.9 | 23.3 |

This indicates that sheet formation is associated with an increase in benzene—ethanol solubles. There is a decrease in pectin and hemicelluloses which may result in a better digestibility of the silage.

EXAMPLE 7

Sunkist oranges, Navel brand, were peeled. The peels were dried at 45° C. in a forced air circulation oven, were ground, were treated with Rohm and Haas Pectinol 41P, Rohm and Haas Rhozyme A-4, NaOH and glycerine, were blended in a Waring Blendor and were cast on glass plates. The resulting sheets were mechanically strong and flexible. The Pectinol 41P contains the necessary enzymes to break down the cellulose, hemicelluloses and pectin into oligosaccharides desirable from the point of view of sheet formation. The Rhozyme A-4, sold as a protease, contains enzymes such as naringinase which break down the bitter tasting glycosides of orange rind. The NaOH was added to increase the pH from 3.5 to 4.5 which is the pH of maximum activity for the breakdown of the polysaccharides. Glycerine was added as a plasticizer for the dry sheet. The results from analyses are listed in the following table:

|  | Orange peels [1] | Sunkist [2] | Navel brand [3] |
|---|---|---|---|
| Benzene-ethanol solubles | 54.4 | 64.4 | 68.0 |
| H₂O solubles | 18.1 | 19.4 | 17.3 |
| Ammonium oxalate solubles | 3.7 | 2.7 | 2.6 |

[1] Untreated, dried.
[2] 1.7% R&H Pectinol 41P, 6.7% glycerine, cast sheet.
[3] 0.4% R&H Pectinol 41P, 0.8% R&H Rhozyme A-4, 6.7% glycerine, NaOH, cast sheet.

EXAMPLE 8

Sheets were prepared as described in the preceding example, using cattle feed prepared by the Kuder Citrus Feed Co., Lake Alfred, Florida, and consisting of dry citrus fruit residues.

Sequential extraction analyses gave the following data:

|  | Kuder Peel Ground (Control) | Kuder Peel, 0.5% R&H Pectinol 41P, 10% Glycerine |
|---|---|---|
| Benzene—ethanol solubles | 37.5 | 38.1 |
| Hot water solubles | 22.8 | 26.3 |
| Ammonium oxalate solubles | 12.2 | 9.1 |
| Sodium chlorite solubles | 5.1 | 4.4 |
| Hemicelluloses | 12.5 | 10.5 |

The increase in solubles was also demonstrated by treating 20 g. of dry, ground Kuder pulp in 500 ml. water at pH 4.1 to 4.7 with increasing amounts of Rohm and Haas Pectinol 41P. The residues from filtration were washed with water and dried to constant weight at 45° C. The results are listed in the following table:

| Amount of Enzyme (Pectinol 41P) % | pH | Weight of Residue g. |
|---|---|---|
| 0.00 | 4.75 | 10.591 |
| 0.01 | 4.60 | 7.740 |
| 0.10 | 4.30 | 6.193 |
| 5.00 | 4.10 | 5.899 |

The greatest effect, which includes the sheet forming effect as well as the weight loss effect, is achieved with a very small amount of enzyme. Increasing amounts of enzyme achieve relatively small increases in solubles. They produce a decrease in pH.

EXAMPLE 9

In this experiment pectin albedo was used. This material from the Ventura Company, California, is isopropanol-extracted citrus fruit albedo. Treatment with 1.7 percent glycerine produced a coherent sheet somewhat more brittle than the sheet obtained from the Sunkist orange rind. Chemical analysis indicates a decrease in ammonium oxalate solubles produced by the breakdown of pectin and a concomitant increase in solubles.

|  | Original Pectin Albedo % | Cast Sheet from Pectin Albedo % |
|---|---|---|
| Benzene—ethanol solubles | 7.5 | 28.4 |
| Water solubles | 39.6 | 37.0 |
| Ammonium oxalate solubles | 10.1 | 3.5 |

EXAMPLE 10

Dry been pulp was used. This material is a cattle feed. It is the dry residue from beet sugar extraction. Sheets were obtained from treatment with water, Rohm and Haas Pectinol 41P and 10 percent glycerine, stirring in a Waring Blendor and casting. The results from the analysis of a sheet obtained using 5 percent enzyme at a pH of 4.1 are:

|  | Untreated Beet Pulp | Sheet |
|---|---|---|
| Benzene—ethanol solubles | 9.0 | 26.2 |
| H₂O solubles | 23.9 | 27.3 |
| Ammonium oxalate solubles | 7.7 | 4.0 |
| Sodium chlorite solubles | 15.4 | 11.5 |
| Hemicelluloses | 21.7 | 13.4 |
| Cellulose | 21.7 | 17.0 |
| Reducing sugars | 0.0 | 6.6 |
| Nonreducing sugars | 4.9 | 1.5 |

The enzyme treatment resulted in an increase in reducing sugars formed from previously insoluble material.

EXAMPLE 11

Tough, flexible sheets were obtained according to the method described in example 7 from fresh carrots, green cabbage, Pascal celery greens, bananas, apple peelings, banana peels, celery, lettuce, orange peelings, orange pulp, cantaloupe rinds, yellow squash, cucumbers, tomatoes, peppers, raisins, dried apricots, dried prunes, candied cherries and ginger.

The enzyme preparations used were Cellulase Astra (Astra Pharm. Products, Inc., Worcester, Mass.), Pectinase P₁P₂ (Nopco Chemical Co., Newark, N.J.), Rohm and Haas Pectinol 59-L, Pectinol R-10, Cellulase 35 and Pectinol 41P. It was observed that the sheets from bananas did not darken during the process nor during storage and that the carrot peels maintained their deep orange color during processing as well as during storage.

EXAMPLE 12

Various sheets were prepared from the same batch of fresh orange peels for the determination of their equilibrium moisture content at room conditions (50 percent R. H. and 74° F.). Dried, ground, air-equilibrated orange peel served as a control.

A high equalibrium moisture content was obtained from the application of either a very active enzyme preparation or of a high amount of enzyme. The sheets thus obtained were very smooth and plastic.

A low equilibrium moisture content was obtained from the application of either an enzyme preparation of little activity or of a low amount of enzyme or from the addition of a filling material which by itself would yield no sheet or a sheet of poor mechanical strength. One filling material used was soybean grits containing 53 percent protein and 30 percent carbohydrates. The sheets obtained by employing any one of the three conditions were rather coarse and brittle.

Some moisture data (over volatiles at 105° C.) of the sheets at equilibrium moisture content at room conditions are given below:

| | Moisture % |
|---|---|
| Orange peel powder, untreated, air-equilibrated | 5.1 |
| Orange sheet prepared with 0.2% Rohm and Haas Cellulase 35 | 8.6 |
| Orange sheet prepared with 0.5% Rohm and Haas Cellulase 35 | 8.8 |
| Orange sheet prepared with 1.0% Rohm and Haas Cellulase 35 | 9.5 |
| Orange sheet prepared with 2 ml. Rohm and Haas Pectinol 59-1 per gram of dry orange peel | 18.9 |
| Orange sheet prepared with 25% Rohm and Haas Pectinol R-10 | 9.1 |
| Orange sheet prepared with 0.1% Rohm and Haas Cellulase 35 and containing 50% soybean grits | 8.4 |
| Orange sheet prepared with 0.5% Rohm and Haas Cellulose 35 and containing 50% soybean grits | 9.0 |
| Orange sheet prepared with 1.0% Rohm and Haas Cellulase 35 and containing 50% soybean grits | 9.3 |

EXAMPLE 13

Sheets were cast in the above-described manner and dried. Weighed portions of the sheets were redissolved in 500 ml. water, poured into 500 ml. graduate cylinders and observed for homogeneousness of the solution over a period of six whole days. The following combinations gave solutions producing neither a deposit on the bottom nor a scum (floc) on the top. They produced 500 ml. of a homogeneous stable colloidal suspension.

Combination A: 2.36 g. orange pulp (dry weight), 1.6 g. Kelcosol Algin (Kelco Co., Clark, N.J.), 0.04 gr. Rohm and Haas Cellulase 35.

Combination B: 3.54 g. orange pulp (dry weight), 1.6 g. Kelcosol Algin, 0.8 g. soybean grits, 0.06 Rohm and Haas Cellulase 35.

I claim:

1. A process for preparing from vegetable, fruit or plant material or parts thereof containing hemicelluloses and/or pectins an edible food product having improved nutritive value, digestibility and storage stability which comprises the steps of:

1. mixing in the presence of from about 8 to about 15 parts of water by weight per part of dry material a vegetable, fruit or plant material or mixture thereof containing pectins and/or hemicelluloses which can be degraded into intermediate weight oligosaccharides and which material contains no more than 50 times, the content of pectins and/or hemicelluloses film-forming convertible carbohydrates by weight of starch, no more than 50 times, the content of said film-forming convertible carbohydrates by weight of protein material, no more than 10 times, the content of film-forming carbohydrates by weight of oily material, and no more than 100 times, the amount of said film-forming convertible carbohydrates by weight of all inert ingredients or nonconvertible carbohydrates, with a catalytic amount of from about 0.01 to about 20 percent by weight of the material to be treated of an enzyme system or mixture exhibiting hemicellulase and/or pectinase activity, while maintaining a pH of from about 3.5 to about 6.0; 2. permitting the enzymes to act on the said material for a period of from about 15 minutes to about 48 hours at a temperature of from about 20° C. to about 80° C.;

3. slurrying the enzyme-treated material while slightly agitating or stirring, maintaining a water content of from about 5 to about 20 times the dry solids content by weight;

4. casting the slurried material into a solid sheet and 5. drying the cast sheet to a moisture content of from about 3 percent to about 20 percent by weight.

PO-1050
(5/69)

UNITED STATES PATENT OFFICE
CERTIFICATE OF CORRECTION

Patent No. __3,615,721__        Dated __October 26, 1971__

Inventor(s) __Henri C. Silberman__

It is certified that error appears in the above-identified patent and that said Letters Patent are hereby corrected as shown below:

Col. 2, line 16.   Change "flurry" to --slurry--

Col. 2, line 48.   Change "or oily" to --of oily--

Col. 2, line 50.   Change "cellulose" to --cellulase--

Col. 2, line 58.   Change "and pectin" to --and/or pectin--

Col. 3, line 25.   Table - Change "6.20" to --62.0--

Col. 4, line 7.    Delete "these" and insert --of--

Col. 4, line 14.   Change "oil" to --oils--

Col. 6, line 6.    Delete "50" and insert --is--

Col. 7, line 9.    Delete "usually" and insert --media.--

Col. 7, line 43.   Change "of water" to --by water--

Col. 8, line 56.   Delete "solubilized" and insert --alpha--

Col. 10, line 15.  Change "been" to --beet--

Col. 10, line 34.  Change "in" second instance to --of--

Claim 1, col. 12, line 11.  After "hemicelluloses" insert --as--

Signed and sealed this 7th day of November 1972.

(SEAL)
Attest:

EDWARD M. FLETCHER, JR.
Attesting Officer

ROBERT GOTTSCHALK
Commissioner of Patents